United States Patent [19]

Razac et al.

[11] Patent Number: 5,407,536

[45] Date of Patent: Apr. 18, 1995

[54] AMPHOTERIC SURFACTANTS AS GLASS FIBER DISPERSANTS FOR THE MANUFACTURE OF UNIFORM GLASS FIBER MATS

[75] Inventors: Shafeek Razac, Colonia; Manilal S. Dahanayake, Princeton Junction; James F. Griffin, Brown Mills, all of N.J.

[73] Assignee: Rhone-Poulenc Inc., Princeton, N.J.

[21] Appl. No.: 194,538

[22] Filed: Feb. 10, 1994

[51] Int. Cl.$^6$ ............................................. D21H 13/40
[52] U.S. Cl. .................................... 162/156; 162/158; 162/182
[58] Field of Search .................. 162/156, 157.1, 157.2, 162/157.3, 157.4, 146, 149, 182; 65/1, 448, 447, 449; 428/357; 106/308

[56] References Cited

U.S. PATENT DOCUMENTS

| | | | |
|---|---|---|---|
| 2,906,660 | 9/1959 | Hungerford et al. | 162/102 |
| 3,012,929 | 12/1961 | Jackson | 162/145 |
| 3,021,225 | 2/1962 | Ziak | 106/78 |
| 3,050,427 | 8/1962 | Slayter et al. | 156/26 |
| 3,103,461 | 9/1963 | Smith et al. | 162/116 |
| 3,108,891 | 10/1963 | Charon et al. | 106/213 |
| 3,228,825 | 1/1966 | Waggoner | 162/145 |
| 3,249,638 | 5/1966 | Muller et al. | 260/571 |
| 3,260,458 | 7/1966 | Klinefelter et al. | 236/66 |
| 3,634,054 | 1/1972 | Sialego | 65/3 |
| 3,766,003 | 10/1973 | Schuller et al. | 162/156 |
| 3,838,895 | 10/1974 | Deem | 303/84 |
| 3,905,067 | 8/1975 | Keib et al. | 19/156 |
| 4,178,203 | 12/1979 | Chakrabarti | 162/156 |
| 4,178,204 | 12/1979 | Chakrabarti | 162/156 |
| 4,178,206 | 12/1979 | Chakrabarti | 162/156 |
| 4,179,331 | 12/1979 | Chakrabarti | 162/156 |
| 4,183,782 | 1/1980 | Bondoc | 162/156 |
| 4,265,704 | 5/1981 | Nahta | 162/156 |
| 4,284,470 | 8/1981 | Bondoc | 162/156 |
| 4,435,474 | 3/1984 | Das et al. | 428/391 |
| 4,457,785 | 7/1984 | Hsu et al. | 106/308 |
| 4,465,500 | 8/1984 | Motsinger et al. | 65/448 |
| 4,681,802 | 7/1987 | Gaa et al. | 65/448 |
| 4,810,576 | 3/1989 | Gas et al. | 428/391 |

FOREIGN PATENT DOCUMENTS

| | | | |
|---|---|---|---|
| 2250719 | 7/1975 | France. | |
| 60-1583 | 7/1985 | Japan. | |
| 4263695 | 9/1985 | Japan | D21H 13/40 |
| 2021899 | 1/1987 | Japan | D21H 5/18 |
| 3-44398 | 2/1991 | Japan. | |

*Primary Examiner*—W. Gary Jones
*Assistant Examiner*—Jose A. Fortuna
*Attorney, Agent, or Firm*—Paul J. Juettner

[57] ABSTRACT

In accordance with the present invention, there is provided herein improved glass fiber dispersions for making uniform glass fiber mats by the wet-laid process. The well dispersed glass fiber compositions of this invention usually are prepared by mixing chopped glass fiber bundles in water with a small amount of an alkylamidoalkyl sultaine surfactant to disperse the bundles into individual fibers. As a feature of the invention, the dispersions may be formed at relatively high glass fiber consistencies. The resultant dispersions then are used to make very high quality glass fiber mats at high rates of production.

20 Claims, No Drawings

AMPHOTERIC SURFACTANTS AS GLASS FIBER DISPERSANTS FOR THE MANUFACTURE OF UNIFORM GLASS FIBER MATS

BACKGROUND OF THE INVENTION

1. Field of the Invention

This invention relates to the manufacture of uniform glass fiber mats by the wet-laid process, and more particularly, it is concerned with improved glass fiber dispersion compositions for use in such a process.

2. Description of the Prior Art

High strength, uniform, thin sheets or mats of glass fibers are finding increasing application in the building materials industry, as for example, in asphalt roofing shingles and as backing sheets for vinyl flooring. These glass fiber mats are replacing similar sheets made traditionally of asbestos fibers. Glass fiber mats usually are made commercially by a wet-laid process, which is carried out on modified paper making machinery, as described, for example, in the book by O. A. Battista, Synthetic Fibers in Papermaking (Wiley) N.Y. 1964. A number of U.S. patents also provide a rather complete description of a wet-laid process, including U.S. Pat. Nos. 2,906,660; 3,012,929; 3,021,255; 3,050,427; 3,103,461; 3,108,891; 3,228,825; 3,634,054; 3,749,638; 3,760,458; 3,766,003; 3,838,995; 3,905,067; 4,179,331 and 4,810,579. The German OLS No. 2454354 (Fr. Demande No. 2,250,719), June, 1975, also is pertinent art in this field.

In general, the known wet-laid process for making glass fiber mats comprises first forming an aqueous suspension of short-length glass fibers under agitation in a mixing tank, then feeding the suspension through a moving screen on which the fibers enmesh themselves while the water is separated therefrom. However, unlike natural fibers, such as cellulose or asbestos, glass fibers do not disperse well in water. Actually, when glass fibers, which come as strands or bundles of parallel fibers, are put into water and stirred, they do not form a well-dispersed system. In fact, upon extended agitation, the fibers agglomerate as large clumps which are very difficult to redisperse.

In an attempt to overcome this inherent problem with glass fibers, it has been the practice in the industry to provide suspending or dispersing aids for the glass fibers, including surfactants, in order to keep the fibers separated from one another in a relatively dispersed state. Such suspending aids usually are materials which increase the viscosity of the medium so that the fibers can suspend themselves in the medium. Some suspending aids actually are surfactants which function by reducing the surface attraction between the fibers. Fatty alkyl ethoxylate (FFE), amine oxide, nonionic and cationic surfactants are some materials that have been used in the manufacture of non-woven glass fiber mats. However, not all of the available suspending aids are entirely satisfactory for large volume manufacture of useful, uniform glass fiber mats.

For example, such polymeric suspending aids materials as polyacrylamides, hydroxyethyl cellulose and the like, provide a highly viscous aqueous solutions at high material concentrations, but which is difficult to handle, and particularly, which drains very slowly through the mat forming screen, or foraminous belt. Furthermore, the degree of the suspension formed using such materials is only fair, and suspensions having a fiber consistency of more than 0.005% give poor quality mats. The viscous suspensions also trap air upon agitation near the formation zone to form stable foams which adversely affect the uniformity and strength of the mats. Finally, the polymers are not effective at low concentrations, and so are expensive for use in what should be a low cost process.

A number of surfactant materials have been tried for dispersing glass fibers in water, for example, the cationic nitrogen surfactants described in Ger. DT No. 2454354/Fr. Demande No. 2,250,719 (June, 1975). With these surfactants, the glass fiber filaments are drawn from an extruder nozzle, coated with the cationic surfactant, and moistened before chopping into short-length fibers. The chopped fibers then are compounded in another aqueous solution of a cationic surfactant. Accordingly, in this process, the cationic surfactants are applied in two stages to form the desired aqueous dispersion. Furthermore, the quality of the dispersions using the materials of this patent application also is poor. U.S. Pat. No. 4,179,331 shows the use of amine oxides surfactants and Japanese patent applications Nos. 91-44398 and 85-158300 show the use of betaine surfactants as dispersants.

Therefore, it is apparent that for a glass fiber dispersion technique to be effective, it is necessary that the dispersions meet several rigid criteria simultaneously which can provide means for making the desired high quality, uniform glass fiber mats at a rapid rate of production in an economically acceptable process. Such criteria are listed below:

1. The dispersing surfactant should provide a uniform dispersion of glass fibers in water effectively at low surfactant concentrations.
2. The dispersions should be efficient at high glass fiber consistencies so that the mats may be formed without having to expend an unnecessarily large amount of energy to separate and handle large quantities of water.
3. The dispersion compositions preferably should not be accompanied by a substantial increase in the viscosity of the medium, which would necessitate extensive pumping equipment at the screen to separate the fibers from the water, and which would make drying of the wet mat difficult.
4. The dispersion compositions should be capable of producing glass fiber mats which have a uniform distribution of fibers characterized by a multidirectional array of fibers. The finished mat product should possess uniform high-strength properties, particularly good tensile strength.
5. The dispersions should be capable of use in the wet-laid process in conventional equipment, at high rates of mat production, without generation of unwanted foams, and without corroding the plant machinery.
6. The surfactant materials preferably should be readily available, at low cost, and be capable of use either by direct addition to the fibers in water, or by precoating the fibers with the surfactant before admixing with water to form the aqueous dispersion composition.
7. The surfactant materials preferably should be capable of dispersing unsized as well as sized glass fibers.

These and other objects and features of the invention will be made apparent from the following more particular description of the invention.

SUMMARY OF THE INVENTION

In accordance with the present invention, there is provided herein improved glass fiber dispersions for making uniform glass fiber mats by the wet-laid process. The well dispersed glass fiber compositions of this invention usually are prepared by mixing chopped glass fibers in water with a small amount of an alkyl amidoalkyl sultaine surfactant. As a feature of the invention, the dispersions may be formed at relatively high glass fiber consistencies. The resultant dispersions then are used to make very high quality glass fiber mats at high rates of production.

The alkylamidoalkyl sultaine surfactants used in the invention are sultaine surfactants having the formula:

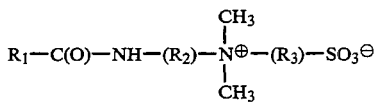

where $R_1$, $R_2$ and $R_3$ suitably are hydrocarbon groups containing between 1–30 carbon atoms. The $R_1$ hydrocarbon groups can be aliphatic or aromatic, and, if aliphatic, can be linear, branched or cyclic in nature, and can be the same or different in each radical. The aliphatic hydrocarbon radical can contain ethylenic unsaturation. The $R_2$ and $R_3$ groups can be linear or branched aliphatic groups selected from among alkyl groups, such as lower alkyl or hydroxyalkyl groups having from 1–4 carbon atoms and substituted alkyl groups thereof. Preferably $R_1$, has from 6 to 30 carbon atoms, such as stearyl, lauryl, oleyl, tridecyl, tetradecyl, hexadecyl, dodecyl, octadecyl, nonadecyl as well as coco, tallow, soya, myristyl and other natural fatty radicals from animal, fish, vegetable and oil seed sources (coconut oil, palm kernel oil, babassu oil, rape seed oil, sun flower oil and the like), or substituted groups thereof, derived from natural or synthetic sources. The sum of the $R_1$, $R_2$ and $R_3$ groups is about 10 to 40 carbon atoms, and most preferably, ranges from about 12 to 26 carbon atoms.

A preferred group of compounds can be represented by the formula:

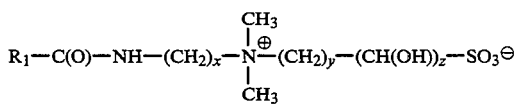

wherein x and y can independently be integers of from 2 to 3, and z can be an integer of 1 or 0, it being understood that the group identified with subscript y can be split and the group with subscript z interposed therebetween, e.g., $CH_2$—$CH(OH)$—$CH_2$. These compounds can be illustrated by cocamidopropyl hydroxy sultaine, laurylamidopropyl hydroxy sultaine, tallowamidopropyl hydroxy sultaine, myristylamidopropyl hydroxy sultaine and the like.

The surfactants of the present invention function well over a broad pH range at or near neutral conditions, or in basic solution; its dispersion quality is irrespective of the degree of hardness of the aqueous medium; the surfactants of the invention provide denser glass mats than conventional dispersants at equal and lower use levels; better uniformity and alignment of glass fibers in all directions; the dispersants are effective with sized and unsized glass fibers; and amphoteric surfactants tend to be milder and more environmentally friendly.

DETAILED DESCRIPTION OF THE INVENTION

Uniform and dense mats are the key objectives in the production of glass fiber mats. These properties are dependent on several chemical factors such as dispersants, viscosity modifiers, defoamers, water hardness, electrolytes, sizing aids, and biocides; and mechanical factors such as temperature, agitation, addition order of raw materials and the like.

The dispersants role in the white water environment is to aid in the dispersion of fibers in the water, maintain the suspension until the slurry is in the formation zone, and rapid drainage of the water to the desired two dimensionally anisotropic non-woven web.

In a typical wet-laid process for making glass fiber mats, a stock suspension of the fibrous material of predetermined fiber consistency is prepared in a mixing tank. The suspension then is pumped into a head box of a paper-making machine where it may be further diluted with water to a lower consistency. The diluted suspension then is distributed over a moving foraminous belt under suction to form a non-woven fiber structure or wet mat on the belt. This wet mat structure may be dried, if necessary, then treated with a binder, and, finally, thoroughly dried to give a finished non-woven mat product.

In the process of the present invention for the production of glass fiber mats, the glass fiber filaments or strands generally are chopped into bundles of fibers about 6.35 millimeters (¼″) to 76.2 millimeters (3″) in length, usually about 12.7 millimeters (½″) to 50.8 millimeters (2″), and preferably about 25.4 millimeters (1″) long, and usually about 3 to 20 microns in diameter, and, preferably about 15 microns. In one embodiment, the fibers are added to water containing the alkylamidoalkyl sultaine surfactant of the invention to form a well-dispersed composition. Suitably, the alkylamidoalkyl sultaine is present at a concentration of about 5–500 ppm of the solution and preferably about 10–25 ppm. Alternatively, the chopped glass fibers may be coated initially by spraying or otherwise applying the alkylamidoalkyl sultaine surfactant thereon, and then dispersing the coated fibers in the aqueous medium. Suitably, the coated fibers contain about 0.01 to 1% by weight of the alkylamidoalkyl sultaine, and, preferably, between 0.025 to 0.25%.

As a feature of the invention, the glass fibers may be dispersed in the alkylamidoalkyl sultaine surfactant at relatively high fiber consistencies while still retaining the effective dispersion characteristics of the composition. For example, a fiber consistency of from about 0.001% to about 3.0% may be used, and, preferably, about 0.05% to about 1% is employed, based upon the weight of the fibers in the water. Such compositions furnish excellent dispersions when agitated in conventional mixing equipment. As mentioned, if desired, the highly concentrated fiber dispersion compositions may be diluted at the head box, usually to a consistency of about 0.1% to about 0.3%, and, preferably about 0.2% which however, is still a highly concentrated fiber dispersion by conventional standards.

The dispersion compositions of the invention are formed without any substantial change in the viscosity of the medium, or of generation of unwanted foams during the process. Furthermore, the dispersions preferably are prepared at or near a neutral pH condition, or perhaps under slightly alkaline conditions, again, without affecting the good quality of the dispersions, or of the finished glass mat products produced therefrom.

The dispersion compositions of the invention produce glass fiber mats which have a high density of fibers therein which are uniformly distributed throughout the mat in a multidirectional array. The finished mats show excellent tensile strength properties, too. The rate of production of the mats is very rapid, in this invention. In fact, a rate of mat production of over 152.4 meters/min. (500 linear ft./min.) using conventional paper-making equipment is readily achievable in this process.

The examples which follow will further illustrate the invention, but are not to be considered as being limiting of the principles or practice of the invention.

In Example 1, which includes Tables I and II below, is a compilation of experimental data to compare the dispersing abilities of the alkylamidoalkyl sultaine surfactants of the invention with other well-known surfactant materials of the prior art. In Table I, compound 1, Group A, illustrates the alkylamidoalkyl sultaines. The remaining compounds 2–24, Groups B-G, are representative of other surfactant materials.

The experiments used in these examples utilized wet chop E-glass. Two types of E-glass were used: 1) standard sized (cationic) E-glass and 2) unsized (deionized water sized) E-glass. The fiber bundles were 32 mm in length and 15 micron in diameter. Both the sized and unsized E-glass contained 12%–16% moisture (water pick-up). The unsized E-glass was not a commercially standard material.

For these tests, the surfactant compounds were dissolved in water at various concentrations, ranging from 20 ppm (0.002%) to 2.5 ppm (0.00025%) by weight of the surfactant (actives basis) in water.

A given dispersion was matted and was rated on a scale of 1 to 5; a rating of 1 was given to a poorest E-glass mat formation where the fiber strands agglomerated and/or did not open up as individual fibers. The handsheet produced by not using any dispersant was rated as 1 and used as the control. The highest quality of dispersed fibers in the handsheet was rated as 5 in which all fibers were separated from each other and the mat was uniform and dense. Intermediate ratings of 4, 3, and 2 were given to E-glass handsheets with a gradual trend to clumped fibers and anisotropic formation. The difference between integers is considered significant. The data was obtained by averaging the sensory observations of two researchers.

EXAMPLE 1

To a 4 liter beaker was added 700 milliliters of deionized water. The amount of surfactant, based on the actives concentration, was then added, from 5 to 20 ppm. The contents of the beaker were stirred on a magnetic stirrer. Record was kept of the pH. The contents of the beaker were transferred to a Premier mixer with a Cowls mixing blade. The agitator was run at 1000 rpm. 3.5 grams of chopped bundles of E-glass filaments (32 millimeters in length and 15 micron in diameter) were then added and vigorously dispersed for 5 minutes. The agitation was stopped to measure foam height. The slurry was added to the headbox of a papermaking machine and the volume was increased to 7 liters with tap water to allow a 1:10 dilution or 0.043% consistency, dry basis of glass fibers. The dispersion then was carried through a laboratory Williams paper-making apparatus to form a 254 millimeters × 25.4 millimeters (10″ × 1″) mat product. The glass fibers in this mat were very evenly distributed throughout.

The dispersant, alkamidopropyl hydroxysultaine (MIRATAINE CBS) was effective over a wide pH range (5.0 to 9.0). The sultaine was effective in dispersing sized and unsized fibers.

TABLE I

| (List of Surfactants Tested) | | |
|---|---|---|
| | COMPOUND # | CHEMICAL DESCRIPTION |
| GROUP A. | | ALKYLAMIDOALKYL SULTAINE |
| | 1. | COCAMIDOPROPYL HYDROXY SULTAINE |
| GROUP B. | | FATTY AMINE ETHOXYLATES |
| | 2. | TALLOWAMINE + 8 EO (EO = ETHYLENE OXIDE) |
| | 3. | TALLOWAMINE + 5 EO |
| | 4. | COCAMINE + 12 EO |
| GROUP C. | | AMINE OXIDE |
| | 5. | LAURYL AMINE OXIDE |
| GROUP D. | | ALKYL PHOSPHATE ESTERS |
| | 6. | NONYL PHENOL + 6 EO PHOSPHATE |
| | 7. | BUTANEDIOL + 6 EO PHOSPHATE |
| | 8. | $C_2$–$C_{10}$ ALCOHOL PHOSPHATE |
| | 9. | PHENOL + 6 EO PHOSPHATE |
| | 10. | NONYL PHENOL + 9 EO PHOSPHATE |
| | 11. | TRISTRYL PHENOL + 16 EO PHOSPHATE |
| GROUP E. | | AMPHOTERICS |
| | 12. | ALKYL ETHER HYDROXY SULTAINE |
| | 13. | SODIUM COCOAMPHO PROPIONATE |
| | 14. | DISODIUM COCOAMPHO DIPROPIONATE |
| | 15. | SODIUM CAPRYLOAMPHO HYDROXYL PROPYL SULFATE |
| | 16. | SODIUM CAPRYLOAMPHO DIACETATE |
| | 17. | SODIUM MIXED $C_8$ AMPHO CARBOXYLATE |
| | 18. | COCAMIDOPROPYL BETAINE |
| GROUP F. | | IMIDAZOLINE |
| | 19. | TALL OIL IMIDAZOLINE |
| GROUP G. | | MODIFIED NONIONICS |
| | 20. | TRIMETHYOL PROPANE + 75 EO |
| | 21. | MEROXIPOL 311 |
| | 22. | POLOXYMER 181 |
| | 23. | POLOXYMER 182 |

TABLE I-continued (List of Surfactants Tested)

| COMPOUND # | CHEMICAL DESCRIPTION |
|---|---|
| 24. | $C_{10}$—$C_{12}$ ALCOHOL + EO + PO + ACETATE |

TABLE II

QUALITY RATINGS OF GLASS FIBER DISPERSIONS USING THE SURFACTANT COMPOUNDS OF TABLE I AT VARIOUS CONCENTRATIONS

| | | QUALITY RATINGS | | | | | |
|---|---|---|---|---|---|---|---|
| | | SIZED FIBERS | | | UNSIZED FIBERS | | |
| | COMPOUND # | 5 ppm | 10 ppm | 20 ppm | 5 ppm | 10 ppm | 20 ppm |
| Control (No surfactant) | | 1 | 1 | 1 | 1 | 1 | 1 |
| Group A. | 1 | 5 | 4,5 | 4 | 4 | 5 | 5 |
| GROUP B. | 2 | 2 | 3 | 3,4 | 2 | 3,4 | 4 |
| | 3 | 3 | 3 | 3 | 3 | 3 | 3,4 |
| | 4 | 2 | 3 | 3 | 3 | 3 | 4 |
| Group C. | 5 | 2 | 3 | 4 | 2 | 3 | 4 |
| GROUP D. | 6 | 1 | 1 | 2 | 1 | 1 | 2 |
| | 7 | 1 | 1 | 1 | 1 | 1 | 1 |
| | 8 | 1 | 1 | 1 | 1 | 1 | 1 |
| | 9 | 1 | 1 | 1 | 1 | 1 | 1 |
| | 10 | 1 | 1 | 1 | 1 | 1 | 1 |
| | 11 | 1 | 1 | 1 | 1 | 1 | 1 |
| Group E. | 12 | 1 | 1 | 2 | 1 | 1 | 2 |
| | 13 | 1 | 1 | 2 | 1 | 1 | 2 |
| | 14 | 1 | 1 | 2 | 1 | 1 | 2 |
| | 15 | 1 | 1 | 2 | 1 | 1 | 2 |
| | 16 | 1 | 1 | 2 | 1 | 1 | 2 |
| | 17 | 1 | 1 | 2 | 1 | 1 | 2 |
| | 18 | 1 | 1,2 | 2 | 1 | 1,2 | 3 |
| Group F. | 19 | 1 | 1 | 1 | 1 | 1 | 1 |
| GROUP G. | 20 | 1 | 1 | 1 | 1 | 1 | 1 |
| | 21 | 1 | 1 | 1 | 1 | 1 | 1 |
| | 22 | 1 | 1 | 1 | 1 | 1 | 1 |
| | 23 | 1 | 1 | 1 | 1 | 1 | 1 |
| | 24 | 1 | 1 | 1 | 1 | 1 | 1 |

From the data in Tables I and II, it is evident that the alkylamidoalkyl sultaine surfactants of the invention (Group A) are outstandingly superior to the other surfactants in their ability to form uniform dispersion glass fiber compositions in water. The compounds of Group A are very effective in forming dispersions using either sized or unsized fibers. The cationic surfactants (Group B), for example, are poor dispersing agents for glass fibers, particularly at low concentrations. Similarly, the other surfactants (Groups C-H) also form very poor fiber dispersions, irrespective of their concentration. In summary, only the surfactants of Group A exhibit high quality dispersion ratings and as will be shown later, they form the desired high quality glass fiber mats in the wet-laid process suitable for use in the building material industry.

While the invention has been described with reference to certain embodiments thereof, it will be understood by those skilled in the art that certain changes and modifications may be made which are within the skill of the art. Accordingly, it is expected to be limited by the appended Claims only, in which:

What is claimed is:

1. In the manufacture of uniform glass mats at a high rate of production by the wet-laid process, the improved method which comprises:

forming an aqueous dispersion of glass fibers by mixing bundles of said fibers of about 6.35 to about 76.2 millimeters (¼ to 3 inches) in length in an aqueous medium at a fiber consistency of about 0.001% to about 3.0% with about 5 ppm to about 500 ppm of an alkylamidoalkyl sultaine surfactant having the formula:

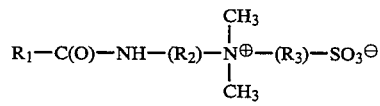

where $R_1$, $R_2$, and $R_3$ are selected from the group consisting of aliphatic and aromatic hydrocarbon radicals, substituted or unsubstituted, containing between 1 and 30 carbon atoms, being the same or different, the sum of $R_1$, $R_2$ and $R_3$ being between about 10 to 40, thereby to substantially disperse said bundles into individual fibers within the aqueous medium, and, passing said dispersion through a mat-forming screen to form the desired uniform glass fiber mat.

2. A method according to claim 1 wherein the $R_1$, $R_2$ and $R_3$ radicals are aliphatic radicals.

3. A method according to claim 2 wherein said radicals are selected from alkyl, hydroxyalkyl and substituted radicals thereof.

4. A method according to claim 1 wherein said sum is about 12 to 26.

5. A method according to claim 1 wherein at least one of said radicals is lower alkyl or hydroxy lower alkyl, and at least one of said radicals is a long chain alkyl or alkyl substituted group.

6. A method according to claim 1 wherein said alkylamidoalkyl sultaine is present in an amount of about 5-100 ppm of said aqueous dispersion.

7. A method according to claim 1 wherein said amount of alkylamidoalkyl sultaine is about 10–25 ppm.

8. A method according to claim 1 wherein said glass fibers are diluted from a more concentrated consistency to a lower consistency before being passed through said mat-forming screen.

9. A method according to claim 1 wherein consistency is about 0.05 to about 1%.

10. A method according to claim 1 wherein said alkylamidoalkyl sultaine is cocamidopropyl hydroxy sultaine.

11. A method according to claim 1 wherein said alkylamiodalkyl sultaine is laurylamidopropyl hydroxy sultaine.

12. A method according to claim 1 wherein said fibers are about 12.7 to 50.8 millimeters in length.

13. A method according to claim 1 wherein said fibers are about 3 to about 20 microns in diameter.

14. A method according to claim 1 further characterized in that the dispersion is prepared at or near a neutral pH condition.

15. A method according to claim 1 further including the steps of drying and curing said mat with a binder to form a finished mat product of high quality.

16. A method according to claim 1, wherein said fibers are about 25.4 millimeters in length.

17. A method according to claim 1, wherein said fibers are about 15 microns in diameter.

18. A method according to claim 1 which further comprises:
(a) precoating said glass fibers with said alkylamidoalkyl sultaine, having the formula of claim 1, and;
(b) adding said thus-coated fibers to an aqueous medium to form said desired dispersion.

19. A method according to claim 18 wherein said coated fibers contain about 0.01 to 1% by weight of the alkylamidoalkyl sultaine.

20. A method according to claim 18 wherein the fibers are coated with between 0.025 to 0.25% of the alkylamidoalkyl sultaine.

* * * * *